(12) United States Patent
Zhang et al.

(10) Patent No.: US 8,917,466 B1
(45) Date of Patent: Dec. 23, 2014

(54) SYSTEMS AND METHODS FOR GOVERNING IN-FLIGHT DATA SETS IN A DATA PROCESSING SYSTEM

(71) Applicant: LSI Corporation, San Jose, CA (US)

(72) Inventors: Fan Zhang, Milpitas, CA (US); Shu Li, San Jose, CA (US); Jun Xiao, Fremont, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/944,966

(22) Filed: Jul. 18, 2013

Related U.S. Application Data

(60) Provisional application No. 61/847,109, filed on Jul. 17, 2013.

(51) Int. Cl.
*G11B 5/09* (2006.01)
*G11B 20/12* (2006.01)

(52) U.S. Cl.
CPC .............. *G11B 20/1258* (2013.01); *G11B 5/09* (2013.01)
USPC .............................................. 360/39; 360/53

(58) Field of Classification Search
None
See application file for complete search history.

(56) References Cited

U.S. PATENT DOCUMENTS

| | | | |
|---|---|---|---|
| 4,553,221 A | 11/1985 | Hyatt | |
| 4,805,174 A | 2/1989 | Kubot | |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,351,274 A | 9/1994 | Chennakeshu | |
| 5,392,299 A | 2/1995 | Rhines | |
| 5,406,593 A | 4/1995 | Chennakeshu | |
| 5,417,500 A | 5/1995 | Martinie | |
| 5,450,253 A | 9/1995 | Seki | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,696,504 A | 12/1997 | Oliveros | |
| 5,710,784 A | 1/1998 | Kindred | |
| 5,717,706 A | 2/1998 | Ikeda | |
| 5,719,871 A | 2/1998 | Helm | |
| 5,802,118 A | 9/1998 | Bliss | |
| 5,844,945 A | 12/1998 | Nam | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | Mccalissister | |

(Continued)

FOREIGN PATENT DOCUMENTS

| JP | 2001/319433 A | 11/2001 |
|---|---|---|
| WO | WO 2010/059264 A1 | 5/2010 |
| WO | WO 2010/126482 A1 | 11/2010 |

OTHER PUBLICATIONS

U.S. Appl. No. 13/426,714, filed Mar. 22, 2012, Shaohua Yang.

(Continued)

*Primary Examiner* — Regina N Holder
(74) *Attorney, Agent, or Firm* — Hamilton DeSanctis & Cha

(57) ABSTRACT

The present inventions are related to systems and methods for data processing, and more particularly to systems and methods for governing a data processing system.

20 Claims, 4 Drawing Sheets

(56) References Cited

U.S. PATENT DOCUMENTS

| | | | |
|---|---|---|---|
| 6,023,783 | A | 2/2000 | Divsalar |
| 6,029,264 | A | 2/2000 | Kobayashi |
| 6,065,149 | A | 5/2000 | Yamanaka |
| 6,097,764 | A | 8/2000 | McCallister |
| 6,145,110 | A | 11/2000 | Khayrallah |
| 6,175,588 | B1 | 1/2001 | Visotsky |
| 6,216,249 | B1 | 4/2001 | Bliss |
| 6,216,251 | B1 | 4/2001 | McGinn |
| 6,266,795 | B1 | 7/2001 | Wei |
| 6,317,472 | B1 | 11/2001 | Choi |
| 6,351,832 | B1 | 2/2002 | Wei |
| 6,377,610 | B1 | 4/2002 | Hagenauer |
| 6,381,726 | B1 | 4/2002 | Weng |
| 6,393,074 | B1 | 5/2002 | Mandyam |
| 6,412,088 | B1 | 6/2002 | Patapoutian et al. |
| 6,473,878 | B1 | 10/2002 | Wei |
| 6,535,553 | B1 | 3/2003 | Limberg et al. |
| 6,625,775 | B1 | 9/2003 | Kim |
| 6,697,441 | B1 | 2/2004 | Bottomley |
| 6,748,034 | B2 | 6/2004 | Hattori |
| 6,757,862 | B1 | 6/2004 | Marianetti, II |
| 6,785,863 | B2 | 8/2004 | Blankenship |
| 6,807,238 | B1 | 10/2004 | Rhee |
| 6,810,502 | B2 | 10/2004 | Eidson |
| 6,839,774 | B1 | 1/2005 | Ahn et al. |
| 6,970,511 | B1 | 11/2005 | Barnette |
| 6,975,692 | B2 | 12/2005 | Razzell |
| 6,986,098 | B2 | 1/2006 | Poeppelman |
| 7,035,327 | B2 | 4/2006 | Nakajima et al. |
| 7,047,474 | B2 | 5/2006 | Rhee |
| 7,058,853 | B1 | 6/2006 | Kavanappillil et al. |
| 7,058,873 | B2 | 6/2006 | Song |
| 7,073,118 | B2 | 7/2006 | Greenberg |
| 7,093,179 | B2 | 8/2006 | Shea |
| 7,117,427 | B2 | 10/2006 | Ophir |
| 7,133,228 | B2 | 11/2006 | Fung |
| 7,136,244 | B1 | 11/2006 | Rothberg |
| 7,184,486 | B1 | 2/2007 | Wu |
| 7,191,378 | B2 | 3/2007 | Eroz |
| 7,203,887 | B2 | 4/2007 | Eroz |
| 7,230,550 | B1 | 6/2007 | Mittal |
| 7,237,181 | B2 | 6/2007 | Richardson |
| 7,308,061 | B1 | 12/2007 | Huang |
| 7,310,768 | B2 | 12/2007 | Eidson |
| 7,313,750 | B1 | 12/2007 | Feng |
| 7,370,258 | B2 | 5/2008 | Iancu |
| 7,415,651 | B2 | 8/2008 | Argon |
| 7,502,189 | B2 | 3/2009 | Sawaguchi |
| 7,523,375 | B2 | 4/2009 | Spencer |
| 7,587,657 | B2 | 9/2009 | Haratsch |
| 7,590,168 | B2 | 9/2009 | Raghavan |
| 7,596,196 | B1 | 9/2009 | Liu et al. |
| 7,646,829 | B2 | 1/2010 | Ashley |
| 7,702,986 | B2 | 4/2010 | Bjerke |
| 7,738,202 | B1 | 6/2010 | Zheng |
| 7,752,523 | B1 | 7/2010 | Chaichanavong |
| 7,779,325 | B2 | 8/2010 | Song |
| 7,802,172 | B2 | 9/2010 | Vila Casado et al. |
| 7,952,824 | B2 | 5/2011 | Dziak |
| 7,957,251 | B2 | 6/2011 | Ratnakar Aravind |
| 7,958,425 | B2 | 6/2011 | Chugg |
| 7,996,746 | B2 | 8/2011 | Livshitz |
| 8,018,360 | B2 | 9/2011 | Nayak |
| 8,020,069 | B1 | 9/2011 | Feng |
| 8,020,078 | B2 | 9/2011 | Richardson |
| 8,161,361 | B1 | 4/2012 | Song et al. |
| 8,201,051 | B2 | 6/2012 | Tan |
| 8,225,168 | B2 | 7/2012 | Yu et al. |
| 8,237,597 | B2 | 8/2012 | Liu |
| 8,255,765 | B1 | 8/2012 | Yeo |
| 8,261,171 | B2 | 9/2012 | Annampedu |
| 8,291,284 | B2 | 10/2012 | Savin |
| 8,291,299 | B2 | 10/2012 | Li |
| 8,295,001 | B2 | 10/2012 | Liu |
| 8,296,637 | B1 | 10/2012 | Varnica |
| 8,370,711 | B2 | 2/2013 | Alrod |
| 8,381,069 | B1 | 2/2013 | Liu |
| 8,413,032 | B1 | 4/2013 | Song |
| 8,429,498 | B1 | 4/2013 | Anholt |
| 8,443,267 | B2 | 5/2013 | Zhong et al. |
| 8,458,555 | B2 | 6/2013 | Gunnam |
| 8,464,142 | B2 | 6/2013 | Gunnam |
| 2001/0010089 | A1 | 7/2001 | Gueguen |
| 2001/0016114 | A1 | 8/2001 | Van Gestel et al. |
| 2002/0021519 | A1 | 2/2002 | Rae |
| 2002/0067780 | A1 | 6/2002 | Razzell |
| 2002/0168033 | A1 | 11/2002 | Suzuki |
| 2003/0031236 | A1 | 2/2003 | Dahlman |
| 2003/0123364 | A1 | 7/2003 | Nakajima et al. |
| 2003/0138102 | A1 | 7/2003 | Kohn et al. |
| 2003/0147168 | A1 | 8/2003 | Galbraith et al. |
| 2003/0188252 | A1 | 10/2003 | Kim |
| 2004/0042436 | A1 | 3/2004 | Terry et al. |
| 2004/0194007 | A1 | 9/2004 | Hocevar |
| 2004/0228021 | A1 | 11/2004 | Yamazaki |
| 2005/0047514 | A1 | 3/2005 | Bolinth |
| 2005/0149842 | A1 | 7/2005 | Kyung |
| 2005/0210367 | A1 | 9/2005 | Ashikhmin |
| 2005/0243456 | A1 | 11/2005 | Mitchell et al. |
| 2006/0002689 | A1 | 1/2006 | Yang et al. |
| 2006/0159355 | A1 | 7/2006 | Mizuno |
| 2007/0234178 | A1 | 10/2007 | Richardson |
| 2007/0297496 | A1 | 12/2007 | Park et al. |
| 2008/0037676 | A1 | 2/2008 | Kyun et al. |
| 2008/0069373 | A1 | 3/2008 | Jiang |
| 2008/0140686 | A1 | 6/2008 | Hong |
| 2008/0304558 | A1 | 12/2008 | Zhu et al. |
| 2009/0003301 | A1 | 1/2009 | Reial |
| 2009/0092174 | A1 | 4/2009 | Wang |
| 2009/0106633 | A1 | 4/2009 | Fujiwara |
| 2009/0125780 | A1 | 5/2009 | Taylor |
| 2009/0132893 | A1 | 5/2009 | Miyazaki |
| 2009/0150745 | A1 | 6/2009 | Langner et al. |
| 2009/0177852 | A1 | 7/2009 | Chen |
| 2009/0185643 | A1 | 7/2009 | Fitzpatrick |
| 2009/0273492 | A1 | 11/2009 | Yang et al. |
| 2010/0077276 | A1 | 3/2010 | Okamura et al. |
| 2010/0088575 | A1 | 4/2010 | Sharon et al. |
| 2010/0150252 | A1 | 6/2010 | Camp |
| 2010/0172046 | A1 | 7/2010 | Liu et al. |
| 2010/0241921 | A1 | 9/2010 | Gunam |
| 2010/0268996 | A1 | 10/2010 | Yang |
| 2010/0322048 | A1 | 12/2010 | Yang et al. |
| 2010/0325511 | A1 | 12/2010 | Oh |
| 2011/0041040 | A1 | 2/2011 | Su |
| 2011/0043938 | A1 | 2/2011 | Mathew |
| 2011/0167227 | A1 | 7/2011 | Yang |
| 2011/0258508 | A1 | 10/2011 | Ivkovic |
| 2011/0264987 | A1 | 10/2011 | Li |
| 2011/0307760 | A1 | 12/2011 | Pisek |
| 2011/0320902 | A1 | 12/2011 | Gunnam |
| 2012/0020402 | A1 | 1/2012 | Ibing |
| 2012/0038998 | A1 | 2/2012 | Mathew |
| 2012/0063023 | A1 | 3/2012 | Mathew |
| 2012/0079353 | A1 | 3/2012 | Liikanen |
| 2012/0124118 | A1 | 5/2012 | Ivkovic |
| 2012/0182643 | A1 | 7/2012 | Zhang |
| 2012/0185744 | A1 | 7/2012 | Varnica |
| 2012/0207201 | A1 | 8/2012 | Xia |
| 2012/0212849 | A1 | 8/2012 | Xu |
| 2012/0236428 | A1 | 9/2012 | Xia |
| 2012/0262814 | A1 | 10/2012 | Li |
| 2012/0265488 | A1 | 10/2012 | Sun |
| 2012/0317462 | A1 | 12/2012 | Liu et al. |
| 2013/0024740 | A1 | 1/2013 | Xia |
| 2013/0031440 | A1 | 1/2013 | Sharon |
| 2013/0120169 | A1 | 5/2013 | Li |
| 2014/0101483 | A1 * | 4/2014 | Yang et al. .................. 714/16 |

OTHER PUBLICATIONS

Casado et al., Multiple-rate low-density parity-check codes with constant blocklength, IEEE Transactions on communications, Jan. 2009, vol. 57, pp. 75-83.

(56) References Cited

OTHER PUBLICATIONS

Cui et al., "High-Throughput Layered LDPC Decoding Architecture", IEEE Transactions on Very Large Scale Integration (VLSI) Systems, vol. 17, No. 4 (Apr. 2009).
Fan et al., "Constrained coding techniques for soft iterative decoders" Proc. IEEE Global Telecommun. Conf., vol. 1b, pp. 631-637 (1999).
Fossorier, Marc P.C. "Quasi-Cyclic Low-Density Parity-Check Codes From Circulant Permutation Maricies" IEEE Transactions on Information Theory, vol. 50, No. 8 Aug. 8, 2004.
Gross, "Stochastic Decoding of LDPC Codes over GF(q)", HDPCC Workshop, Tel Aviv (Mar. 2, 2010).
Gunnam et al., "VLSI Architectures for Layered Decoding for Irregular LDPC Codes of WiMax", IEEE ICC Proceedings (2007).
Hagenauer, J. et al A Viterbi Algorithm with Soft-Decision Outputs and its Applications in Proc. IEEE Globecom, pp. 47. 11-47 Dallas, TX Nov. 1989.
Han and Ryan, "Pinning Techniques for Low-Floor Detection/Decoding of LDPC-Coded Partial Response Channels", 5th International Symposium on Turbo Codes &Related Topics, 2008.
Kautz, "Fibonacci Codes for Synchronization Control", IEEE Trans. Info. Theory, vol. 11, No. 2, pp. 284-292 (Apr. 1965).
Kschischang et al., "Factor Graphs and the Sum-Product Algorithm", IEEE Transactions on Information Theory, vol. 47, No. 2 (Feb. 2001).
Leduc-Primeau et al., "A Relaxed Half-Stochastic Iterative Decoder for LDPC Codes", IEEE Communications Society, IEEE Globecom proceedings (2009).
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Li et al "Efficient Encoding of Quasi-Cyclic Low-Density Parity Check Codes" IEEE Transactions on Communications on 53 (11) 1973-1973, 2005.
Lim et al. "Convergence Analysis of Constrained Joint Adaptation in Recording Channels" IEEE Trans. on Signal Processing vol. 54, No. 1 Jan. 2006.
Lin et al "An efficient VLSI Architecture for non binary LDPC decoders"—IEEE Transaction on Circuits and Systems II vol. 57, Issue 1 (Jan. 2010) pp. 51-55.
Moon et al, "Pattern-dependent noise prediction in signal-dependent Noise," IEEE JSAC, vol. 19, No. 4 pp. 730-743, Apr. 2001.
Moon et al., "Maximum transition run codes for data storage systems", IEEE Trans. Magn., vol. 32, No. 5, pp. 3992-3994 (Sep. 1996).
Patapoutian et al "Improving Re-Read Strategies by Waveform Averaging" IEEE Transactions on Mag. vol. 37 No. 6, Nov. 2001.
Richardson, T "Error Floors of LDPC Codes" Flarion Technologies Bedminster NJ 07921, tjr@flarion.com (not dated).
Shokrollahi "LDPC Codes: An Introduction", Digital Fountain, Inc. (Apr. 2, 2003).
Spagnol et al, "Hardware Implementation of Gf(2Am) LDPC Decoders", IEEE Transactions on Circuits and Systemsši: Regular Papers, vol. 56, No. 12 (Dec. 2009).
Tehrani et al., "Fully Parallel Stochastic LDPC Decoders", IEEE Transactions on Signal Processing, vol. 56, No. 11 (Nov. 2008).
Todd et al., "Enforcing maximum-transition-run code constraints and low-density parity check decoding", IEEE Trans. Magn., vol. 40, No. 6, pp. 3566-3571 (Nov. 2004).
U.S. Appl. No. 13/227,416, filed Sep. 7, 2011, Lei Chen, Unpublished.
U.S. Appl. No. 13/295,150, filed Nov. 14, 2011, Zongwang Li, Unpublished.
U.S. Appl. No. 13/770,008, filed Feb. 19, 2013, Shaohua Yang, Unpublished.
U.S. Appl. No. 13/269,832, filed Oct. 10, 2011, Haitao Xia, Unpublished.
U.S. Appl. No. 13/239,683, filed Sep. 22, 2011, Changyou Xu, Unpublished.
U.S. Appl. No. 13/186,234, filed Jul. 19, 2011, Haitao Xia, Unpublished.
U.S. Appl. No. 13/213,751, filed Aug. 19, 2011, Fan Zhang, Unpublished.
U.S. Appl. No. 13/283,549, filed Oct. 27, 2011, Wu Chang, Unpublished.
U.S. Appl. No. 13/180,495, filed Jul. 11, 2011, Chung-Li Wang, Unpublished.
U.S. Appl. No. 13/300,078, filed Nov. 18, 2011, Chung-Li Wang, Unpublished.
U.S. Appl. No. 13/305,510, filed Nov. 28, 2011, Lei Chen, Unpublished.
U.S. Appl. No. 13/305,551, filed Nov. 28, 2011, Yang Han, Unpublished.
U.S. Appl. No. 13/296,022, filed Nov. 14, 2011, Victor Krachkovsky, Unpublished.
U.S. Appl. No. 13/174,537, filed Jun. 30, 2011, Anantha Raman Krishnan, Unpublished.
U.S. Appl. No. 13/174,453, filed Jun. 30, 2011, Johnson Yen, Unpublished.
U.S. Appl. No. 13/171,615, filed Jun. 29, 2011, Bradley D. Seago, Unpublished.
U.S. Appl. No. 13/113,219, filed May 23, 2011, Yang Han, Unpublished.
U.S. Appl. No. 13/284,730, filed Oct. 28, 2011, Fan Zhang, Unpublished.
U.S. Appl. No. 13/284,767, filed Oct. 28, 2011, Fan Zhang, Unpublished.
U.S. Appl. No. 13/302,119, filed Nov. 22, 2011, Lei Chen, Unpublished.
U.S. Appl. No. 13/621,341, filed Sep. 17, 2012, Shaohua Yang, Unpublished.
U.S. Appl. No. 13/415,430, filed Mar. 8, 2012, Nayak Ratnakar Aravind, Unpublished.
U.S. Appl. No. 13/269,852, filed Oct. 10, 2011, Haitao Xia, Unpublished.
U.S. Appl. No. 13/989,583, filed Oct. 15, 2012, Shaohua Yang, Unpublished.
U.S. Appl. No. 13/227,544, filed Sep. 8, 2011, Shaohua Yang, Unpublished.
U.S. Appl. No. 13/483,100, filed May 30, 2012, Fan Zhang, Unpublished.
U.S. Appl. No. 13/483,105, filed May 30, 2012, Xuebin Wu, Unpublished.
U.S. Appl. No. 13/426,693, filed Mar. 22, 2012, Shaohua Yang, Unpublished.
U.S. Appl. No. 13/619,907, filed Sep. 14, 2012, Fan Zhang, Unpublished.
U.S. Appl. No. 13/652,012, filed Oct. 15, 2012, Fan Zhang, Unpublished.
U.S. Appl. No. 13/415,326, filed Mar. 8, 2012, Shaohua Yang, Unpublished.
U.S. Appl. No. 13/746,301, filed Jan. 21, 2013, Shu Li, Unpublished.
U.S. Appl. No. 13/766,911, filed Feb. 14, 2013, Shaohua Yang, Unpublished.
U.S. Appl. No. 13/766,891, filed Feb. 14, 2013, Shu Li, Unpublished.
U.S. Appl. No. 13/875,357, filed May 2, 2013, Shaohua Yang, Unpublished.
U.S. Appl. No. 13/868,779, filed Apr. 23, 2013, Fan Zhang, Unpublished.
U.S. Appl. No. 13/853,711, filed Mar. 29, 2013, Shu Li, Unpublished.
U.S. Appl. No. 13/912,059, filed Jun. 6, 2013, Fan Zhang, Unpublished.
U.S. Appl. No. 13/918,510, filed Jun. 14, 2013, Shu Li, Unpublished.
U.S. Appl. No. 13/705,407, filed Dec. 5, 2012, Lingyan Sun, Unpublished.
U.S. Appl. No. 13/445,848, filed Apr. 12, 2012, Bruce Wilson, Unpublished.
U.S. Appl. No. 13/426,714, filed Mar. 22, 2012, Shaohua Yang, Unpublished.
U.S. Appl. No. 13/372,580, filed Feb. 14, 2012, Fan Zhang, Unpublished.
U.S. Appl. No. 13/422,986, filed Mar. 16, 2012, Fan Zhang, Unpublished.
U.S. Appl. No. 13/362,409, filed Jan. 31, 2012, Fan Zhang, Unpublished.

(56) References Cited

OTHER PUBLICATIONS

U.S. Appl. No. 13/316,858, filed Dec. 12, 2011, Zongwang Li, Unpublished.
U.S. Appl. No. 13/597,001, filed Aug. 28, 2012, Fan Zhang, Unpublished.
U.S. Appl. No. 13/316,741, filed Dec. 12, 2011, Yang Han, Unpublished.
U.S. Appl. No. 13/445,878, filed Apr. 12, 2012, Yu Liao, Unpublished.
U.S. Appl. No. 13/412,520, filed Mar. 5, 2012, Fan Zhang, Unpublished.
U.S. Appl. No. 13/340,974, filed Dec. 30, 2011, Dan Liu, Unpublished.
U.S. Appl. No. 13/340,951, filed Dec. 30, 2011, Lei Chen, Unpublished.
U.S. Appl. No. 13/474,660, filed May 17, 2012, Zongwang Li, Unpublished.
U.S. Appl. No. 13/433,693, filed Mar. 29, 2012, Fan Zhang, Unpublished.
U.S. Appl. No. 13/545,833, filed Jul. 10, 2012, Zhi Bin Li, Unpublished.
U.S. Appl. No. 13/596,819, filed Aug. 28, 2012, Shaohua Yang, Unpublished.
U.S. Appl. No. 13/369,468, filed Feb. 9, 2012, Zongwang Li, Unpublished.
U.S. Appl. No. 13/596,947, filed Aug. 28, 2012, Fan Zhang, Unpublished.
U.S. Appl. No. 13/596,978, filed Aug. 28, 2012, Fan Zhang, Unpublished.
U.S. Appl. No. 13/327,279, filed Dec. 15, 2011, Wei Feng, Unpublished.

Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xiao, et al "Nested Codes With Multiple Interpretations" retrieved from the Internet URL: http://www.ece.nmsu.edu/~jkliewer/paper/XFKC_CISS06 (retrieved on Dec. 5, 2012).
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "Block-LDPC: A Practical LDPC Coding System Design Approach", IEEE Trans. on Circuits, Regular Papers, vol. 5, No. 4, pp. 766-775, Apr. 2005.

* cited by examiner

SYSTEMS AND METHODS FOR GOVERNING IN-FLIGHT DATA SETS IN A DATA PROCESSING SYSTEM

CROSS REFERENCE TO RELATED APPLICATIONS

The present application claims priority to (is a non-provisional of) U.S. Pat. App. No. 61/847,109 entitled "Systems and Methods for Governing In-Flight Data Sets in a Data Processing System", and filed Jul. 17, 2013 by Zhang et al. The entirety of the aforementioned provisional patent application is incorporated herein by reference for all purposes.

BACKGROUND OF THE INVENTION

The present inventions are related to systems and methods for data processing, and more particularly to systems and methods for governing a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations through a data detector circuit and/or data decoder circuit depending upon the characteristics of the data being processed. Depending upon a number of factors, different data sets require more or fewer iterations through the data detector circuit and/or the data decoder circuit. The variability of processing time applied to each data set makes the data processing function unpredictable, and as such complicated to control.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for governing a data processing system.

Various embodiments of the present invention provide data processing systems that include: a central memory circuit operable to store two or more processing data sets; a maximum in-flight data set control circuit operable to assert a control signal based at least in part on a determination of a maximum number of processing data sets; and a data decoder circuit. The data decoder circuit is operable to: select one of the two or more processing data sets as a decoder input, and to apply a data decoding algorithm to the decoder input to yield a decoded output; and select one of the two or more in-flight data sets for elimination as an in-flight data set based at least in part on assertion of the control signal.

This summary provides only a general outline of some embodiments of the invention. The phrases "in one embodiment," "according to one embodiment," in various embodiments", in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
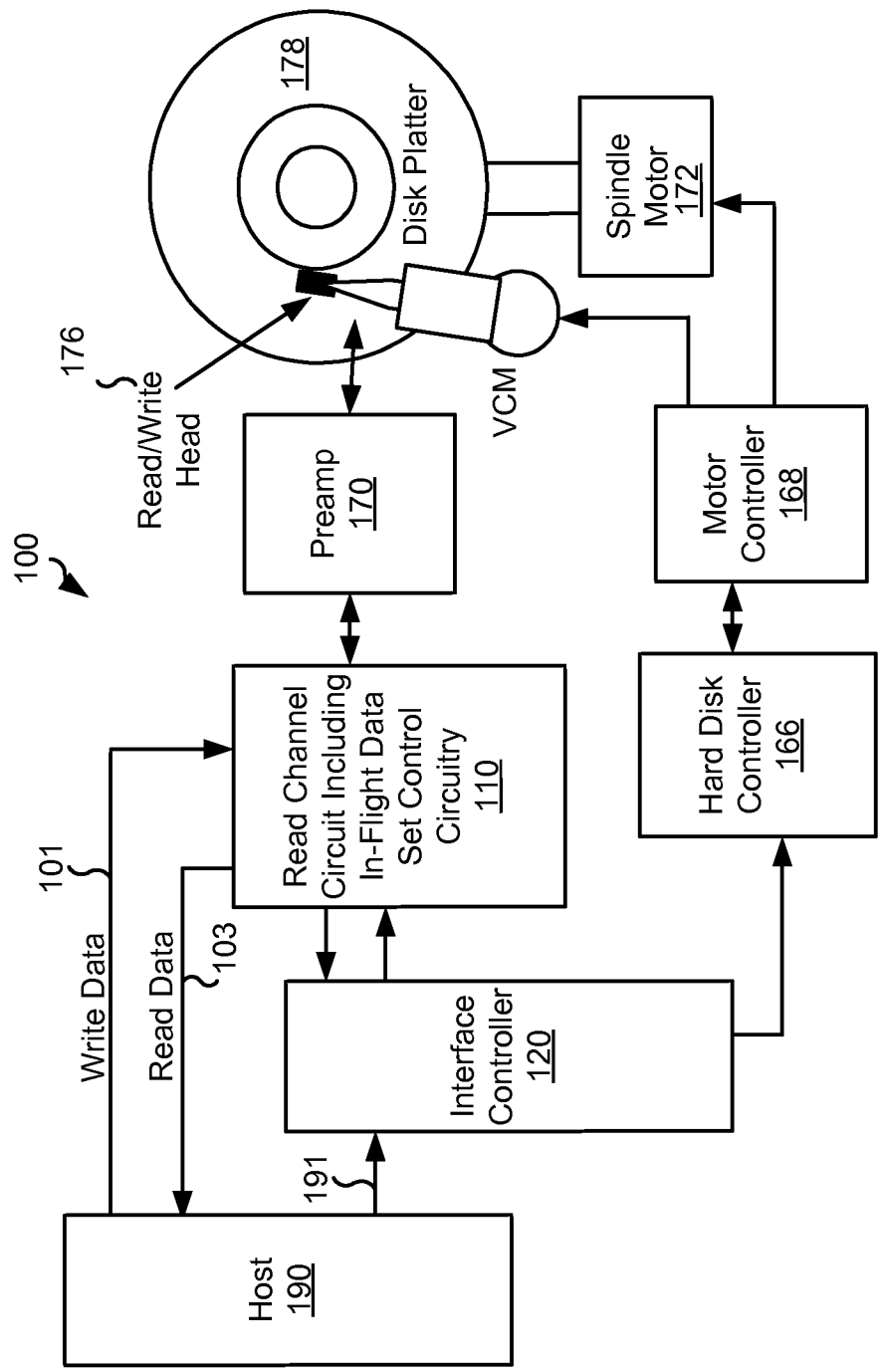
FIG. 1 shows a storage system including in-flight data set control circuitry in accordance with various embodiments of the present invention.

The present inventions are related to systems and methods for data processing, and more particularly to systems and methods for governing a data processing system.

Some embodiments of the present invention are applied to a data processing circuit performing iterative data processing. This iterative data processing applies a variable amount of data processing depending upon characteristics of a given data set. As data set remains in an input buffer while the iterative data processing is applied. The input buffer is fed from a spread sector control buffer which may store more data than the input buffer. The spread sector control buffer allows for a multi-sector block of data to be re-arranged to spread data from a given sector across multiple sectors (i.e., interleaved) to reduce the effect of localized noise in a channel. When the interleaved multi-sector block of data is received, the interleaving is reversed and the resulting de-interleaved data (i.e., arranged such that each sector of the multiple sectors are contiguous) is stored to the spread sector control buffer. Data received by the data processing circuit implementing the iterative data processing is referred to as an "in-flight data set" until the iterative processing of the data set is complete and a result is provided. Some embodiments of the present invention implement operational controls to limit the number of in-flight data sets in existence at any given time.

The iterative data processing may include a data detector circuit that applies a data detection algorithm to a data set to yield a detected output, and a data decoder circuit that applies a data decoding algorithm to a decoder input derived from the detected output to yield a decoded output. The process of passing data through both the data detector circuit and the data decoder circuit is referred to herein as a "global iteration". During each global iteration, the data decoding algorithm may be repeatedly applied to a processing data set. This reapplication of the data decoding algorithm is referred to herein as a "local iteration". In particular embodiments of the present invention, a default number of ten local iterations are allowed for each global iteration. Based upon the disclosure provided herein, one of ordinary skill in the art will recognize a variety of numbers of local iterations that may be used as a default in relation to different embodiments of the present invention. In some circuits where out of order result reporting is allowed, a large number of global iterations (e.g., 120) for a given data set may be supported.

Various embodiments of the present invention provide data processing systems that include: a central memory circuit operable to store two or more processing data sets; a maximum in-flight data set control circuit operable to assert a control signal based at least in part on a determination of a maximum number of processing data sets; and a data decoder circuit. The data decoder circuit is operable to: select one of the two or more processing data sets as a decoder input, and to apply a data decoding algorithm to the decoder input to yield a decoded output; and select one of the two or more in-flight data sets for elimination as an in-flight data set based at least in part on assertion of the control signal. In some cases, the maximum number of processing data sets is user programmable. In various cases, the system is implemented as an integrated circuit. In one or more cases, the system is implemented as part of a storage device.

In some instances of the aforementioned embodiments, the data processing system further includes an input buffer and a data detector circuit. The input buffer is operable to store two or more data sets corresponding to the processing data sets. The data detector circuit is operable to apply a data detection algorithm to a data input selected from one of the two or more data sets corresponding to the processing data sets to yield a detector output, wherein one or the two or more processing data sets is derived from the detector output. In such instances, the maximum in-flight data set control circuit may be operable to assert the control signal based at least in part on a combination of the determination of the maximum number of processing data sets and a fill status of the input buffer.

In one or more instances of the aforementioned embodiments, the data processing system further includes an output circuit operable to receive the decoded output in an output buffer, and to transfer the decoded output to a recipient device. In such instances, the maximum in-flight data set control circuit may be operable to assert the control signal based at least in part on a combination of the determination of the maximum number of processing data sets and a fill status of the output buffer.

In various instances of the aforementioned embodiments, the data processing system further includes: an input buffer operable to store two or more data sets corresponding to the processing data sets; a data detector circuit operable to apply a data detection algorithm to a data input selected from one of the two or more data sets corresponding to the processing data sets to yield a detector output, wherein one or the two or more processing data sets is derived from the detector output; and an output circuit operable to receive the decoded output in an output buffer, and to transfer the decoded output to a recipient device. In such instances, the maximum in-flight data set control circuit may be operable to assert the control signal based at least in part on a combination of the determination of the maximum number of processing data sets, a fill status of the input buffer, and a fill status of the output buffer. In particular cases, the fill status of the input buffer indicates the input buffer is not empty, and the fill status of the output buffer indicates the output buffer is empty.

Other embodiments of the present invention provide methods for data processing that include: storing two or more processing data sets in a central memory; determining a number of processing data sets within a data processing system including the central memory; asserting a control signal based at least in part on a determination of the number of processing data sets in relation to a maximum number of processing data sets; applying a data decoding algorithm by a data decoder circuit to one of the processing data sets accessed from the central memory to yield a decoded output; and eliminating one of the processing data sets from the central memory based at least in part on assertion of the control signal.

In some instances of the aforementioned embodiments, the methods further include: providing an input buffer operable to store two or more data sets corresponding to the processing data sets; and applying a data detection algorithm by a data detector circuit to a data input selected from one of the two or more data sets corresponding to the processing data sets to yield a detector output, wherein one of the two or more processing data sets is derived from the detector output. In such instances, asserting the control signal may be based at least in part upon a combination of the determination of the maximum number of processing data sets and a fill status of the input buffer.

In other instances of the aforementioned embodiments, the methods further include: providing an output circuit operable to receive the decoded output in an output buffer, and to transfer the decoded output to a recipient device. In such instances, asserting the control signal may be based at least in part upon a combination of the determination of the maximum number of processing data sets and a fill status of the output buffer.

In yet other instances of the aforementioned embodiments, the methods further include: providing an input buffer operable to store two or more data sets corresponding to the processing data sets; applying a data detection algorithm by a data detector circuit to a data input selected from one of the two or more data sets corresponding to the processing data sets to yield a detector output, wherein one of the two or more processing data sets is derived from the detector output; and providing an output circuit operable to receive the decoded output in an output buffer, and to transfer the decoded output to a recipient device. In such instances, asserting the control signal may be based at least in part upon a combination of the determination of the maximum number of processing data sets, a fill status of the input buffer, and a fill status of the output buffer. In some cases, the fill status of the input buffer indicates the input buffer is not empty, and the fill status of the output buffer indicates the output buffer is empty.

Turning to FIG. 1, a storage system 100 including a read channel circuit 110 having detector output reuse circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme. A host 190 provides a control input 191 to interface controller 120. In some embodiments of the present invention, control input 191 includes a maximum in-flight data set value. In addition, host 190 provides write data 101 that is to be stored to disk platter 178 and receives read data 103 derived from disk platter 178.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103. The opposite is a write operation where write data 101 is provided to read channel circuit 110 that encodes the data and stores it to disk platter 178 via preamplifier 170 and read/write head assembly 176.

As part of processing data accessed from disk platter 178, read channel circuit 110 applies a variable number of global and local iterations using a data detector circuit and a data decoder circuit. This results in a variable amount of time that a data set may be processing (i.e., in-flight). The maximum number of in-flight data sets is governed by in-flight data set control circuitry based upon control input 191. In some cases, read channel circuit 110 may include a data processing circuit similar to that discussed below in relation to FIG. 2, and may operate similar to that discussed below in relation to FIGS. 3a-3c below.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
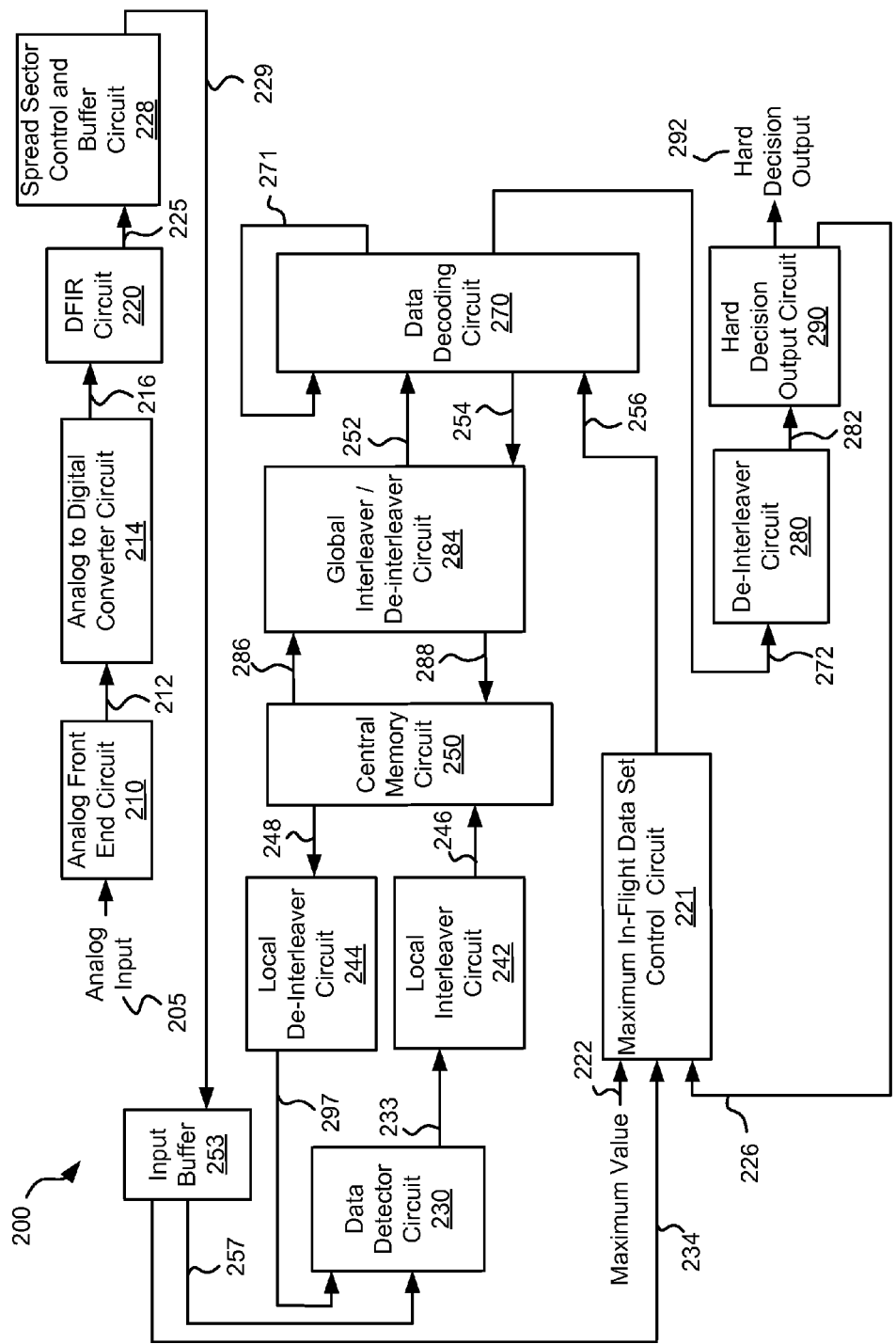
FIG. 2 shows a data processing system including a maximum in-flight data set control circuit in accordance with some embodiments of the present invention.

Turning to FIG. 2, a data processing system 200 including a maximum in-flight data set control circuit 221 is shown in accordance with some embodiments of the present invention. Data processing system 200 includes an analog front end circuit 210 that receives an analog signal 205. Analog front end circuit 210 processes analog signal 205 and provides a processed analog signal 212 to an analog to digital converter circuit 214. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog signal 205 is derived from a read/write head assembly (not shown) that is disposed in relation to a storage medium (not shown). In other cases, analog signal 205 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 205 may be derived.

Analog to digital converter circuit 214 converts processed analog signal 212 into a corresponding series of digital samples 216. Analog to digital converter circuit 214 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 216 are provided to an equalizer circuit 220. Equalizer circuit 220 applies an equalization algorithm to digital samples 216 to yield an equalized output 225. In some embodiments of the present invention, equalizer circuit 220 is a digital finite impulse response filter circuit as are known in the art. It may be possible that equalized output 225 may be received directly from a storage device in, for example, a solid state storage system. In such cases, analog front end circuit 210, analog to digital converter circuit 214 and equalizer circuit 220 may be eliminated where the data is received as a digital data input.

Equalized output 225 represents multiple sectors of data that were interleaved such that portions of each of the individual sector is intermixed with portions of other individual sectors. To reverse this interleaving, equalized output 225 is provided to a spread sector control and buffer circuit 228 that rearranges the received data such that the portions of individual sectors are aligned such that each of the individual sectors of data are arranged contiguously to yield de-interleaved multiple sector data block 229. Portions of de-interleaved multiple sector data block 229 is provided on a sector by sector basis to input buffer 253 as space becomes available in input buffer 253.

Input buffer 253 includes sufficient memory to maintain one or more codewords until processing of that codeword is completed through a data detector circuit 230 and a data decoding circuit 270 including, where warranted, multiple global iterations (passes through both data detector circuit 230 and data decoding circuit 270) and/or local iterations (passes through data decoding circuit 270 during a given global iteration). In some cases, input buffer 253 stores less data than that stored by spread sector control and buffer circuit 228. An output 257 is provided to data detector circuit 230.

Data detector circuit 230 may be a single data detector circuit or may be two or more data detector circuits operating in parallel on different codewords. Whether it is a single data detector circuit or a number of data detector circuits operating in parallel, data detector circuit 230 is operable to apply a data detection algorithm to a received codeword or data set. In some embodiments of the present invention, data detector circuit 230 is a Viterbi algorithm data detector circuit as are known in the art. In other embodiments of the present invention, data detector circuit 230 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 230 is used to apply the data detection algorithm to the received codeword for a first global iteration applied to the received codeword, and another data detector circuit included in data detector circuit 230 is operable apply the data detection algorithm to the received codeword guided by a decoded output accessed from a central memory circuit 250 on subsequent global iterations.

Upon completion of application of the data detection algorithm to the received codeword on the first global iteration, data detector circuit 230 provides a detector output 233. Detector output 233 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 233 is provided to a local interleaver circuit 242. Local interleaver circuit 242 is operable to shuffle sub-portions (i.e., local chunks) of the data set included as detected output and provides an interleaved codeword 246. Interleaver circuit 242 may be any circuit known in the art that is capable of shuffling data sets to yield a re-arranged data set.

Interleaved codeword 246 is stored to a central memory circuit 250. Once a data decoding circuit 270 is available, an instance of interleaved codeword 246 is accessed from central memory circuit 250 as a stored codeword 286 and globally interleaved by a global interleaver/de-interleaver circuit 284. Global interleaver/De-interleaver circuit 284 may be any circuit known in the art that is capable of globally rearranging codewords. Global interleaver/De-interleaver circuit 284 provides a decoder input 252 into data decoding circuit 270. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 270 applies a data decode algorithm to decoder input 252 to yield a decoded output 271. In cases where another local iteration (i.e., another pass through data decoder circuit 270) is desired, data decoding circuit 270 re-applies the data decode algorithm to decoder input 252 guided by decoded output 271. This continues until either a maximum number of local iterations is exceeded or decoded output 271 converges.

Where decoded output 271 fails to converge (i.e., fails to yield the originally written data set) and a number of local iterations through data decoder circuit 270 exceeds maximum number of allowable local iterations, the resulting decoded output is provided as a decoded output 254 back to central memory circuit 250 where it is stored awaiting another global iteration through a data detector circuit included in data detector circuit 230. Prior to storage of decoded output 254 to central memory circuit 250, decoded output 254 is globally de-interleaved to yield a globally de-interleaved output 288 that is stored to central memory circuit 250. The global de-interleaving reverses the global interleaving earlier applied to stored codeword 286 to yield decoder input 252. When a data detector circuit included in data detector circuit 230 becomes available, a previously stored de-interleaved output 288 accessed from central memory circuit 250 and locally de-interleaved by a de-interleaver circuit 244. De-interleaver circuit 244 re-arranges decoder output 248 to reverse the shuffling originally performed by interleaver circuit 242. A resulting de-interleaved output 297 is provided to data detector circuit 230 where it is used to guide subsequent detection of a corresponding data set previously received as equalized output 225.

Alternatively, where the decoded output converges (i.e., yields the originally written data set), the resulting decoded output is provided as an output codeword 272 to a de-interleaver circuit 280. De-interleaver circuit 280 rearranges the data to reverse both the global and local interleaving applied to the data to yield a de-interleaved output 282. De-interleaved output 282 is provided to a hard decision output circuit 290. Hard decision output circuit 290 is operable to re-order data sets that may complete out of order back into their original order. The originally ordered data sets are then provided as a hard decision output 292.

Maximum in-flight data set control circuit 221 operates to assure that the number of data sets processing between spread sector control and buffer circuit 228 and hard decision output circuit 290 (i.e., in-flight data sets) is less than or equal to a maximum value 222. In some cases, maximum value 222 is a programmable register value. In various cases, the register value is programmed by a host controlling data processing system 200. Where maximum in-flight data set control circuit 221 determines that the number of in-flight data sets exceeds that indicated by maximum value 222, maximum in-flight data set control circuit 221 asserts a kickout signal 256.

Kickout signal 256 is provided to data decoding circuit 270. In response, data decoding circuit 270 selects a codeword maintained in central memory circuit 250 to be eliminated from central memory circuit 250 and thereby reduce the number of in-flight data sets. The selected codeword is transferred from central memory circuit 250 to hard decision output circuit 290 to be provided as a hard decision output 292 even though the data set may not have converged. In one particular embodiment of the present invention, data decoding circuit 270 selects the codeword in central memory circuit 250 to which the largest number of global iterations have been applied. Based upon the disclosure provided herein, one of ordinary skill in the art will recognize a variety of criteria that may be used to select the codeword from central memory circuit 250 to be kicked out of data processing system 200.

In one embodiment of the present invention, maximum in-flight data set control circuit 221 monitors the number of in-flight data sets by monitoring the number of data sets stored to spread sector control and buffer circuit 228 and the number of data sets provided as hard decision output 292. The number of data sets stored to spread sector control and buffer circuit 228 is reduced by the number of data sets provided as hard decision output 292 to yield the number of in-flight data sets. This number of in-flight data sets is compared against maximum value 222. Where the number of in-flight data sets is equal to or exceeds maximum value 222, then kickout signal 256 is asserted when the following conditions are met: (1) status 226 indicates that hard decision output circuit 290 is empty (i.e., does not have a data set to be transferred as hard decision output 292), and (2) status 234 indicates that input buffer 253 has at least one codeword being processed. The following pseudocode represents operation of maximum in-flight data set control circuit 221:

If (data added to spread sector control and buffer circuit 221){
   Increase the number of in-flight data sets by the number of codwords in the received data}
If (data provided as hard decision output 292) {
Decrease the number of in-flight data sets by the number of codwords in the provided data}
If (number of in-flight data sets>=Maximum Value 222){
If (status 226 indicates hard decision output circuit 290 is empty && status 234 indicates input buffer 253 is not empty) {assert kickout signal 256 }}

As one advantage of the aforementioned embodiment, a host device (not shown) receiving hard decision outputs 292 in an order different from that requested by the host device (not shown) without having to track and re-order an unwieldy large number of received data sets. Further, using such an approach to control the number of in-flight data sets allows the size of the buffer in hard decision output circuit 290 and the size of input buffer 253 to correspond to maximum value 222. Performance degradation in a low signal to noise ratio regime is mitigated as codewords are not kicked out of data processing system 200 if there is already a codeword being processed through hard decision output circuit 290.

Figure 3A:
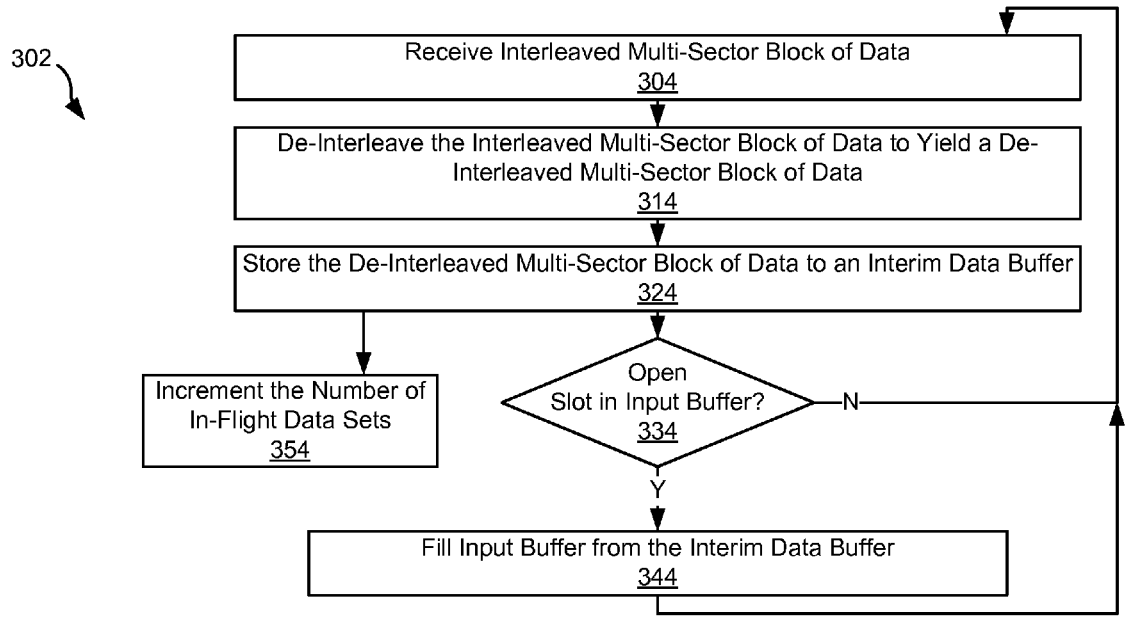
FIGS. 3a-3c are flow diagrams showing a method for data processing including in-flight data set control in accordance with various embodiments of the present invention.
Figure 3B:
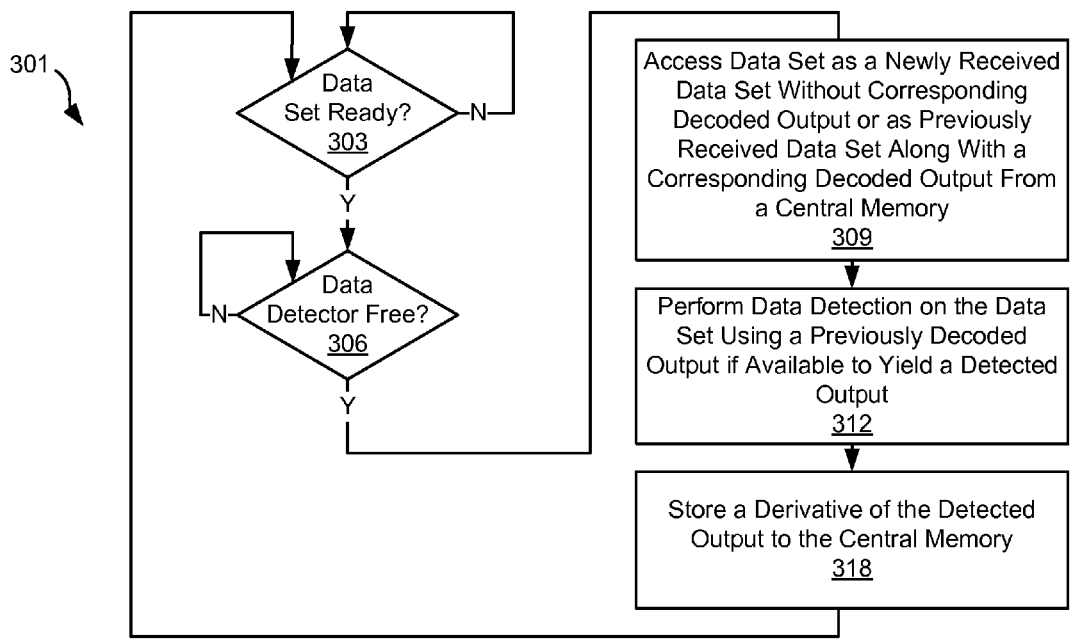
Figure 3C:
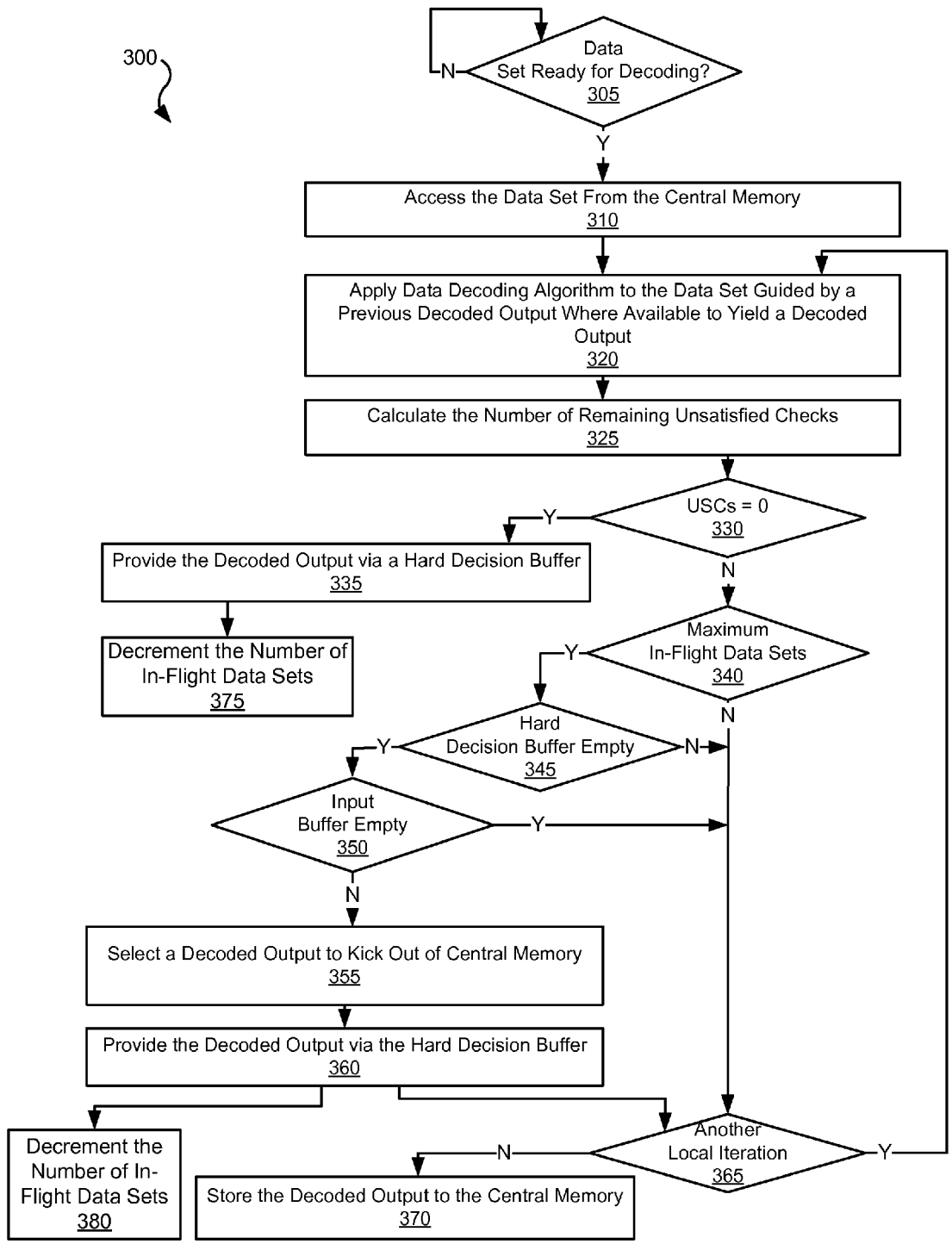

Turning to FIGS. 3a-3c, flow diagrams 300, 301, 302 showing a method for data processing including in-flight data set control in accordance with various embodiments of the present invention. Following flow diagram 302 of FIG. 3a, an interleaved multi-sector block of data is received (block 304). Interleaved multi-sector block of data includes a number of sectors of data with portions of those sectors of data shuffled to increase the distance between sector portions affected by localized noise in the channel. The interleaved multi-sector block of data is de-interleaved (block 314). This de-interleaving operates to rearrange the sector portions such that the block of data includes sector portions arranged contiguously to yield the original data sectors. These data sectors are stored to an interim data buffer (block 324). It is then determined whether there is an open slot in the input buffer (block 334). Where there is an open slot in the input buffer (block 334), the input buffer is filled from data stored in the interim data buffer (block 344). In addition, whenever data is stored to the interim data buffer, the number of in-flight data sets is incremented by an amount corresponding to the number of data sets included in the data that is stored (block 354).

Following flow diagram 301 of FIG. 3b, it is determined whether a data set or codeword is ready for application of a data detection algorithm (block 303). In some cases, a data set is ready when it is received from a data decoder circuit via a central memory circuit. In other cases, a data set is ready for processing when it is first made available in the input buffer. Where a data set is ready (block 303), it is determined whether a data detector circuit is available to process the data set (block 306).

Where the data detector circuit is available for processing (block 306), the data set is accessed by the available data detector circuit (block 309). The data detector circuit may be, for example, a Viterbi algorithm data detector circuit or a maximum a posteriori data detector circuit. Where the data set is a newly received data set (i.e., a first global iteration), the newly received data set is accessed. In contrast, where the data set is a previously received data set (i.e., for the second or later global iterations), both the previously received data set and the corresponding decode data available from a preceding global iteration (available from a central memory) is accessed. The accessed data set is then processed by application of a data detection algorithm to the data set (block 312). Where the data set is a newly received data set (i.e., a first global iteration), it is processed without guidance from decode data available from a data decoder circuit. Alternatively, where the data set is a previously received data set (i.e., for the second or later global iterations), it is processed with guidance of corresponding decode data available from preceding global iterations. Application of the data detection algorithm yields a detected output. A derivative of the detected output is stored to the central memory (block 318). The derivative of the detected output may be, for example, an interleaved or shuffled version of the detected output.

Following flow diagram 300 of FIG. 3c, it is determined whether a data set or codeword is ready for processing by a data decoder circuit (block 305). A data set may be considered ready for processing once it has completed the processing discussed in flow diagram 301 and is available in the central memory circuit. Where a data set is ready for processing (block 305), the data set is accessed from the central memory (block 310). A data decoding algorithm is applied to the data set guided by a previous decoded output where available to yield a decoded output (block 320). In some embodiments of the present invention, the data decoding algorithm is a low complexity data decoding algorithm.

The number of remaining unsatisfied checks in the decoded output is calculated or determined (block 325). This is done by determining which if any parity check equations in a processing data set remain unsatisfied after the decoding process. Where the number of remaining unsatisfied checks is zero (block 330), the data decoding process is considered to have completed successfully and the decoded output is provided (block 335). This decoded output is provided to a requester by buffering it in a hard decision output buffer from where it is accessed and provided to a requesting device. In addition, whenever data is provided the corresponding data set is eliminated from the central memory and the input buffer, and the number of in-flight data sets is decremented (block 375).

Otherwise, where any unsatisfied checks remain (block 335), processing continues by determining whether the number of in-flight data sets is greater than or equal to a defined value (block 340). In some cases, the defined value is a user programmable value. Where the number of in-flight data sets does not equal or exceed the defined value (block 340), it is determined whether another local iteration is allowed (block 365). In some cases, seven (7) local iterations are allowed for each global iteration. Based upon the disclosure provided herein, one of ordinary skill in the art will recognize other numbers of allowable local iterations that may be used in relation to different embodiments of the present invention. Where no additional local iterations are allowed (block 365), the decoded output is stored back to the central memory to await the next global iteration (block 370). Alternatively, where at least one more local iteration is allowed (block 365), the processes beginning at block 320 are repeated for a subsequent local iteration.

Alternatively, where the number of in-flight data sets equals or exceeds the defined value (block 340), it is determined whether the hard decision buffer is empty (i.e., there is not a decoded output being provided to a requesting device) (bock 345). Where the hard decision buffer is not empty (block 345), there is a data set being provided to a requesting device that will reduce the number of in-flight data sets eliminating the need to kick out a data set to artificially reduce the number of in-flight data sets. As such, the processes of block 365 are performed without first triggering the elimination of an in-flight data set.

Otherwise, where the hard decision buffer is empty (block 345), it is determined whether there is a data set remaining in the input buffer for processing (block 350). Where one or more data sets remain in the input buffer for processing (block 350), there is no need to reduce the number of in-flight data sets. As such, the processes of block 365 are performed without first triggering the elimination of an in-flight data set. Alternatively, where the input buffer is empty (block 350), a decoded output maintained in the central memory is selected to be kicked out of the data processing system (block 355). In one particular embodiment of the present invention, the decoded output in the central memory circuit to which the largest number of global iterations have been applied is selected. Based upon the disclosure provided herein, one of ordinary skill in the art will recognize a variety of criteria that may be used to select the codeword from the central memory circuit to be kicked out of data processing system. This selected decoded output is provided (block 360). This decoded output is provided to a requester by buffering it in a hard decision output buffer from where it is accessed and provided to a requesting device. As the decoded output had not yet completed processing (i.e., the unsatisfied checks are greater than zero), an indication of a failed processing is also provided to the requesting device. In addition, whenever data is provided the corresponding data set is eliminated from the central memory and the input buffer, and the number of in-flight data sets is decremented (block 380). At this juncture, the processes of block 365 are performed.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a central memory circuit operable to store two or more processing data sets;
   a maximum in-flight data set control circuit operable to:
      determine a maximum number of processing data sets based at least in part on a feedback signal from a data decoder circuit;
      assert a control signal based at least in part on the determination of the maximum number of processing data sets; and
   the data decoder circuit operable to:
      select one of the two or more processing data sets as a decoder input, and to apply a data decoding algorithm to the decoder input to yield a decoded output; and
      select one of the two or more in-flight data sets for elimination as a processing data set based at least in part on assertion of the control signal.

2. The data processing system of claim 1, wherein the data processing system further comprises:
   an input buffer operable to store two or more data sets corresponding to the processing data sets; and
   a data detector circuit operable to apply a data detection algorithm to a data input selected from one of the two or more data sets corresponding to the processing data sets to yield a detector output, wherein one of the two or more processing data sets is derived from the detector output.

3. The data processing system of claim 2, wherein the maximum in-flight data set control circuit is operable to assert the control signal based at least in part on a combination of the determination of the maximum number of processing data sets and a fill status of the input buffer.

4. The data processing system of claim 1, wherein the data processing system further comprises:
   an output circuit operable to receive the decoded output in an output buffer, and to transfer the decoded output to a recipient device.

5. The data processing system of claim 4, wherein the maximum in-flight data set control circuit is operable to assert the control signal based at least in part on a combination of the determination of the maximum number of processing data sets and a fill status of the output buffer.

6. The data processing system of claim 1, wherein the data processing system further comprises:
   an input buffer operable to store two or more data sets corresponding to the processing data sets;
   a data detector circuit operable to apply a data detection algorithm to a data input selected from one of the two or more data sets corresponding to the processing data sets to yield a detector output, wherein one or the two or more processing data sets is derived from the detector output;
   an output circuit operable to receive the decoded output in an output buffer, and to transfer the decoded output to a recipient device; and
   wherein the maximum in-flight data set control circuit is operable to assert the control signal based at least in part on a combination of the determination of the maximum number of processing data sets, a fill status of the input buffer, and a fill status of the output buffer.

7. The data processing system of claim 6, wherein the fill status of the input buffer indicates the input buffer is not empty, and the fill status of the output buffer indicates the output buffer is empty.

8. The data processing system of claim 7, wherein the data detection algorithm is selected from a group consisting of: a Viterbi data detection algorithm, and a maximum a posterior data detection algorithm.

9. The data processing system of claim 1, wherein the maximum number of processing data sets is user programmable.

10. The data processing system of claim 1, wherein the system is implemented as an integrated circuit.

11. The data processing system of claim 1, wherein the system is implemented as part of a storage device.

12. The data processing system of claim 1, wherein the data decoder circuit is a low density parity check decoder circuit.

13. A method for data processing, the method comprising:
   storing two or more processing data sets in a central memory;
   determining a number of processing data sets within a data processing system including the central memory based at least in part on a feedback from a data decoder circuit;
   asserting a control signal based at least in part on a determination of the number of processing data sets in relation to a maximum number of processing data sets;
   applying a data decoding algorithm by the data decoder circuit to one of the processing data sets accessed from the central memory to yield a decoded output; and
   eliminating one of the processing data sets from the central memory based at least in part on assertion of the control signal.

14. The method of claim 13, the method further comprising:
   providing an input buffer operable to store two or more data sets corresponding to the processing data sets;
   applying a data detection algorithm by a data detector circuit to a data input selected from one of the two or more data sets corresponding to the processing data sets to yield a detector output, wherein one of the two or more processing data sets is derived from the detector output; and
   wherein asserting the control signal is based at least in part upon a combination of the determination of the maximum number of processing data sets and a fill status of the input buffer.

15. The method of claim 13, the method further comprising:
   providing an output circuit operable to receive the decoded output in an output buffer, and to transfer the decoded output to a recipient device; and
   wherein asserting the control signal is based at least in part upon a combination of the determination of the maximum number of processing data sets and a fill status of the output buffer.

16. The method of claim 13, the method further comprising:
   providing an input buffer operable to store two or more data sets corresponding to the processing data sets;
   applying a data detection algorithm by a data detector circuit to a data input selected from one of the two or more data sets corresponding to the processing data sets to yield a detector output, wherein one of the two or more processing data sets is derived from the detector output;
   providing an output circuit operable to receive the decoded output in an output buffer, and to transfer the decoded output to a recipient device; and
   wherein asserting the control signal is based at least in part upon a combination of the determination of the maximum number of processing data sets, a fill status of the input buffer, and a fill status of the output buffer.

17. The method of claim 16, wherein the fill status of the input buffer indicates the input buffer is not empty, and the fill status of the output buffer indicates the output buffer is empty.

18. The method of claim 13, wherein the data detection algorithm is selected from a group consisting of: a Viterbi data detection algorithm, and a maximum a posterior data detection algorithm.

19. The method of claim 13, wherein the data decoder circuit is a low density parity check decoder circuit.

20. A storage device, the storage device comprising:
   a storage medium;
   a head assembly disposed in relation to the storage medium and operable to provide a sensed signal corresponding to information on the storage;
   a read channel circuit including:
   an analog front end circuit operable to provide an analog signal corresponding to the sensed signal;
   an analog to digital converter circuit operable to sample the analog signal to yield a series of digital samples;
   an equalizer circuit operable to equalize the digital samples to yield a data input;
      a central memory circuit operable to store the data input as two or more processing data sets;
   a maximum in-flight data set control circuit operable;
      determine a maximum number of processing data sets based at least in part on a feedback signal from a data decoder circuit;
      assert a control signal based at least in part on the determination of the maximum number of processing data sets; and
   the data decoder circuit operable to:
      select one of the two or more processing data sets as a decoder input, and to apply a data decoding algorithm to the decoder input to yield a decoded output; and
      select one of the two or more in-flight data sets for elimination as a processing data set based at least in part on assertion of the control signal.

* * * * *